United States Patent [19]
Goyal et al.

[11] Patent Number: 5,802,549
[45] Date of Patent: Sep. 1, 1998

[54] METHOD AND APPARATUS FOR PATCHING PAGES OF ROM

[75] Inventors: Prabhakar Goyal, Austin; Grama Kasturi Harish, Cedar Park; James Darrell Heath, Austin, all of Tex.

[73] Assignee: International Business Machines Corporation, Armonk, N.Y.

[21] Appl. No.: 572,694

[22] Filed: Dec. 14, 1995

[51] Int. Cl.[6] .................................................. G06F 12/02
[52] U.S. Cl. ............................ 711/102; 711/165; 395/712
[58] Field of Search ............................. 395/429, 492, 395/712, 182.05, 182.06

[56] References Cited

U.S. PATENT DOCUMENTS 4,542,453  9/1985  Patrick et al. ................ 395/182.06

Primary Examiner—Eddie P. Chan
Assistant Examiner—Reginald G. Gragdon
Attorney, Agent, or Firm—Jenkens & Gilchrist; George E. Clark; Mark S. Walker

[57] ABSTRACT

A method and apparatus for patching ROM pages using minimal RAM pages is accomplished by reserving a limited number of RAM pages which are shared to facilitate a patching process. The patching process begins when a flagged page of ROM (i.e., a page that is to be patched) is copied into one of the reserved pages of RAM. Having copied the flagged page, a patch file is accessed to retrieve updated code and outdated code of the flagged page. The process overwrites the outdated code with the updated code to produce a patched code. The patched code is read by a processor and is subsequently overwritten by another patched code that represents another flagged page of ROM.

7 Claims, 4 Drawing Sheets

METHOD AND APPARATUS FOR PATCHING PAGES OF ROM

TECHNICAL FIELD OF THE INVENTION

This invention relates generally to computer systems and, in particular, to a method and apparatus for patching pages of ROM.

BACKGROUND OF THE INVENTION

Basic computing systems are known to include a processor, random access memory (RAM), read only memory (ROM), and an interconnecting bus. Typically, an algorithm or algorithms are stored in ROM. The processor reads programming instructions from the ROM to execute the corresponding algorithm. While executing the programming instructions, the processor utilizes the RAM to store data that is currently being utilized.

As is also known, the basic computing system may be incorporated in almost any type of commercial or industrial product. For example, the basic computing system is used in computers, telephones, digital radios, refrigerators, toasters, cars, etc. In many of these products, the basic computing system is an embedded system.

As is further known, most algorithms are revised and/or updated after its original release. The revisions or updates may result from programming bugs (i.e., programming errors) or from operational enhancements. To update or revise an algorithm in RON of an embedded system, the ROM must be reprogrammed with the updated code. To achieve this, however, the user of the embedded system typically needs to return the embedded system, or the ROM of the embedded system, to the manufacturer of the embedded system. The manufacturer then reprograms the ROM to include the updated code and returns the embedded system to the user. As one would expect, this is a time-consuming and tedious process.

As an alternative to returning the embedded system, or the ROM of the embedded system, to the manufacturer, the basic computing system may include a patch file. The patch file contains the identity of pages of ROM to be updated, the updated code, and the outdated code. For each page of ROM to be updated, i.e., patched, a page in RAM is reserved. To implement the patch, the code stored in a page of ROM is copied into a reserved page in RAM. The patch file is then accessed to overwrite the outdated code with the updated code. Once this is done, the reserved RAM page is read instead of the corresponding ROM page.

While this technique allows algorithms stored in ROM to be updated without having to return the ROM to the manufacturer, it can consume a considerable amount of RAM. As mentioned, for each page of ROM that is being patched, a page in RAM must be reserved. The reserved RAM pages are dedicated to the patching process and cannot be used for other typical RAM functions. As such, the more the RAM is dedicated to patching, the less it can be used for the other RAM functions. This can be very costly, in that, additional RAM may be required to ensure that the stored algorithms have sufficient RAM to execute. Therefore, a need exists for a method and apparatus that allows for patching of ROM code with minimal use of RAM.

SUMMARY OF THE INVENTION

Generally, the present invention provides a method and apparatus for patching ROM pages using minimal RAM pages. This is accomplished by reserving a limited number of RAM pages which are shared to facilitate a patching process. The patching process begins when a flagged page of ROM (i.e., a page that is to be patched) is copied into one of the reserved pages of RAM. Having copied the flagged page, a patch file is accessed to retrieve updated code and outdated code of the flagged page. The process overwrites the outdated code with the updated code to produce a patched code. The patched code is read by a processor and is subsequently overwritten by another patched code that represents another flagged page of ROM. Thus, the reserved pages of RAM are shared (i.e., one page of RAM is used to patch many flagged pages of ROM) which eliminates the one-to-one RAM page allocation of the mentioned prior art technique.

DETAILED DESCRIPTION OF A PREFERRED EMBODIMENT

Figure 1:
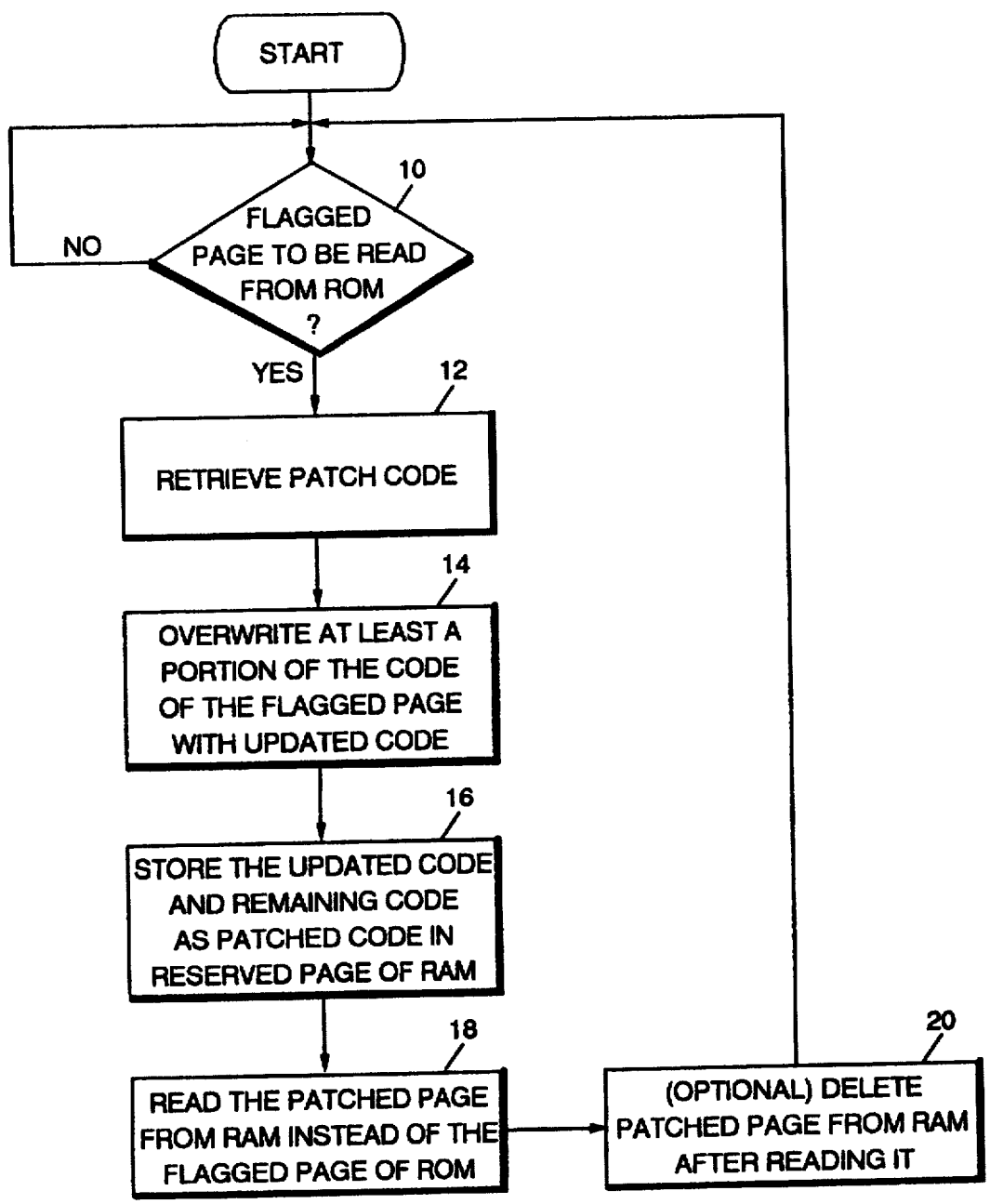
FIG. 1 illustrates a logic diagram that may be used to implement a ROM page patching process in accordance with the present invention.

FIG. 1 illustrates a logic diagram that illustrates the functional steps of an embodiment of the present invention. The steps shown in FIG. 1 may be implemented in programming instructions which could be stored on a processor readable storage medium. A processor readable storage medium may be any type of digital storage device, such as RAM, ROM, magnetic tape, flash memory, CD-ROM, etc. The process begins at step 10 wherein it is determined whether a flagged page is to be read from ROM. For the purposes of this application, a page is based on the hardware constraints of the computing system. In essence, the page is based on the amount of data that the processor acquires each time it accesses the RAM. In a typical computing system, a page is 4K in length. As one skilled in the art will readily appreciate, the page length may be of any size as determined by the processor constraints in the computing system.

Once a flagged page of ROM is to be read, the process proceeds to step 12 wherein patch code is retrieved from a patch file. Generally, the patch code includes the identity of the flagged page, updated code, and outdated code. Updated code is the newest revisions or bug fixes. The outdated code represents the code of the ROM page to be replaced by the updated code. Note that the amount of updated code may contain only a few bits of information, or bytes of information, or may consume the entire page.

Having retrieved the patch code, the process proceeds to step 14 wherein at least a portion of the code of the flagged page is overwritten with updated code. Having done this, the process proceeds to step 16 wherein the updated code and remaining code are stored as patch code in a reserved page of the RAM. Having stored the patched code, the process proceeds to step 18 wherein the patch code is read from RAM instead of the flagged page of ROM. The process then may proceed to step 20, which is an optional step, or return to step 10 for a subsequent flagged page.

If the process includes step 20, the patched page will be deleted from RAM after it has been read. Step 20 does little more than clear the reserved page of RAM for subsequent inputting of data. As one skilled in the art will readily appreciate, code stored in the reserved page of RAM may deleted by overwriting it with subsequent code.

The process of FIG. 1 is a continual operation. As such, for the next flagged page, steps 12 through 18 would be executed using the same reserved page of RAM. Thus, the reserved page of RAM is shared among the flagged pages of ROM regardless of the number of flagged pages in ROM (i.e., the number of ROM pages to be patched). As can be readily appreciated, this technique substantially reduces the number of RAM pages need to perform the patching functions, thus making more efficient use of the costly RAM.

Figure 2:
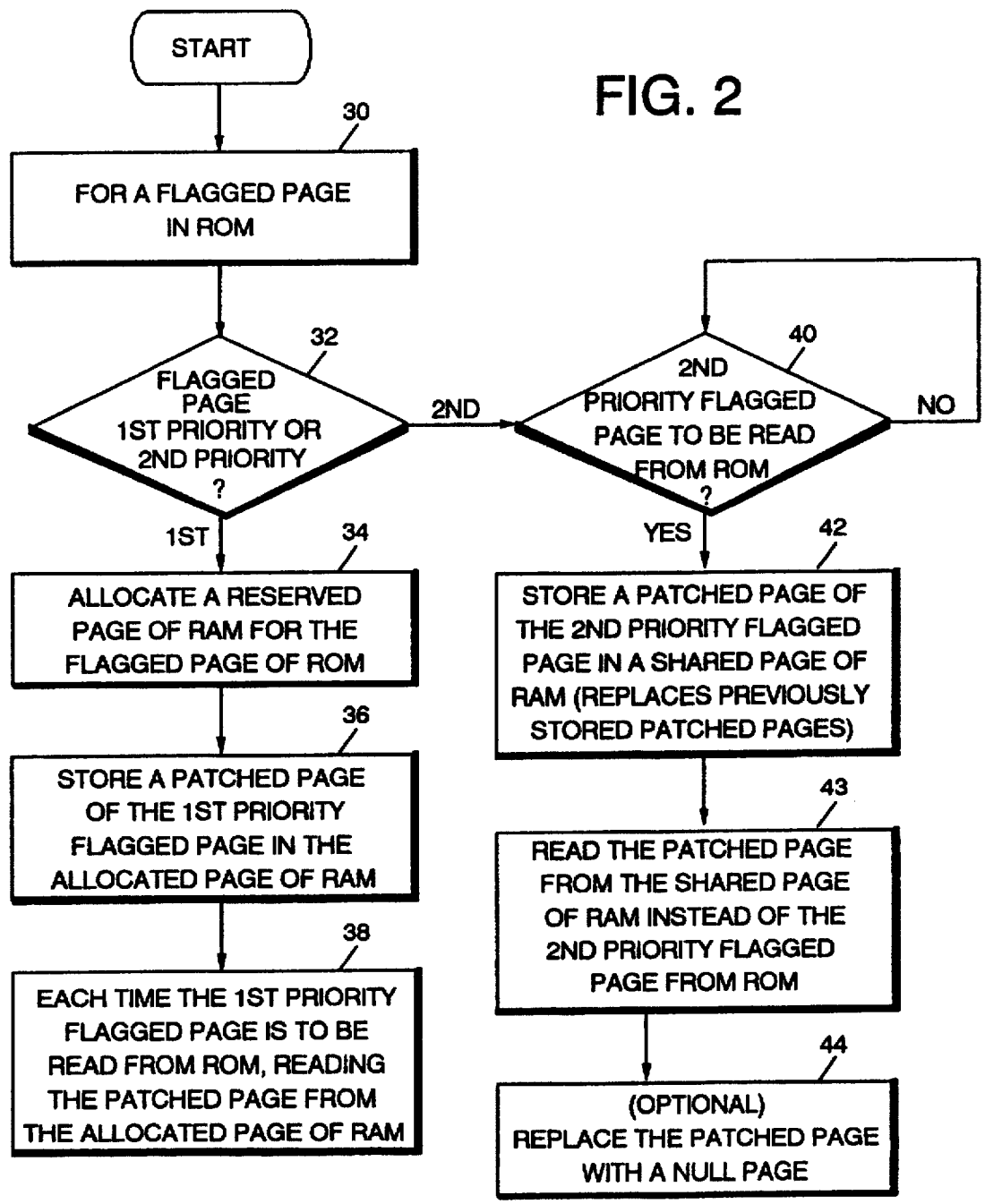
FIG. 2 illustrates a logic diagram that may be used to implement an alternate ROM patching process in accordance with the present invention.

FIG. 2 illustrates a logic diagram that may be used to implement an alternate embodiment of the present invention. The steps of FIG. 2 may be implemented in programming instructions and stored on a processor readable storage medium. The process begins at step 30 which signifies that the remaining steps are done for each flagged page in ROM. The process then proceeds to step 32 wherein a determination is made as to whether the flagged page is of a first priority or a second priority. The priority levels are based on the algorithm requirements. For example, there may be some flagged pages of ROM (i.e., ones to be patched) that are time critical and thus cannot afford any processing delays to establish patch code on the fly (i.e., in real time). Such flagged pages have been designated as first priority flagged pages. On the other hand, the algorithm may include other flagged pages in ROM that are not as time sensitive and thus can afford to have patched code generated on the fly. Such pages are given a second priority.

If the flagged page is of a first priority, the process proceeds to step 34 wherein a reserved page of RAM is allocated for the flagged page of ROM. Having done this, the process proceeds to step 36 wherein a patched page of the first priority flagged page is stored in the allocated RAM page. The generation of the patch page is identical to steps 14–16 of FIG. 1.

Having stored the patched page of the first priority flagged page in RAM, the process proceeds to step 38 wherein the patched page is read from RAM instead of ROM. For first priority flagged pages, their patched pages are created at initiation of the algorithm. This is very similar to the prior art technique of reserving a RAM page for each page of ROM to be patched, but in the present invention is only be done for critical flagged pages.

If, however, the flagged page is of a second priority, the process proceeds to step 40. At step 40, the process determines whether the second priority flagged page is to be read from ROM. If yes, the process proceeds to step 42 wherein a patched page of the second priority flagged page is stored in a shared page of RAM. By storing this information in the shared page, any previously stored patched pages are overwritten, thus allowing for on-the-fly generation of patched pages using a single shared page or only a few shared pages of RAM.

Having stored the patched page in RAM, the process proceeds to step 43 wherein the patched page is read from the shared page of RAM. This is done instead of reading the second priority flagged page from ROM, insuring that the processor is retrieving the most current programming instructions or data. Step 44 is an optional step and indicates that the patched page may be replaced with a null page. This is similar to step 20 in FIG. 1.

Figure 3:
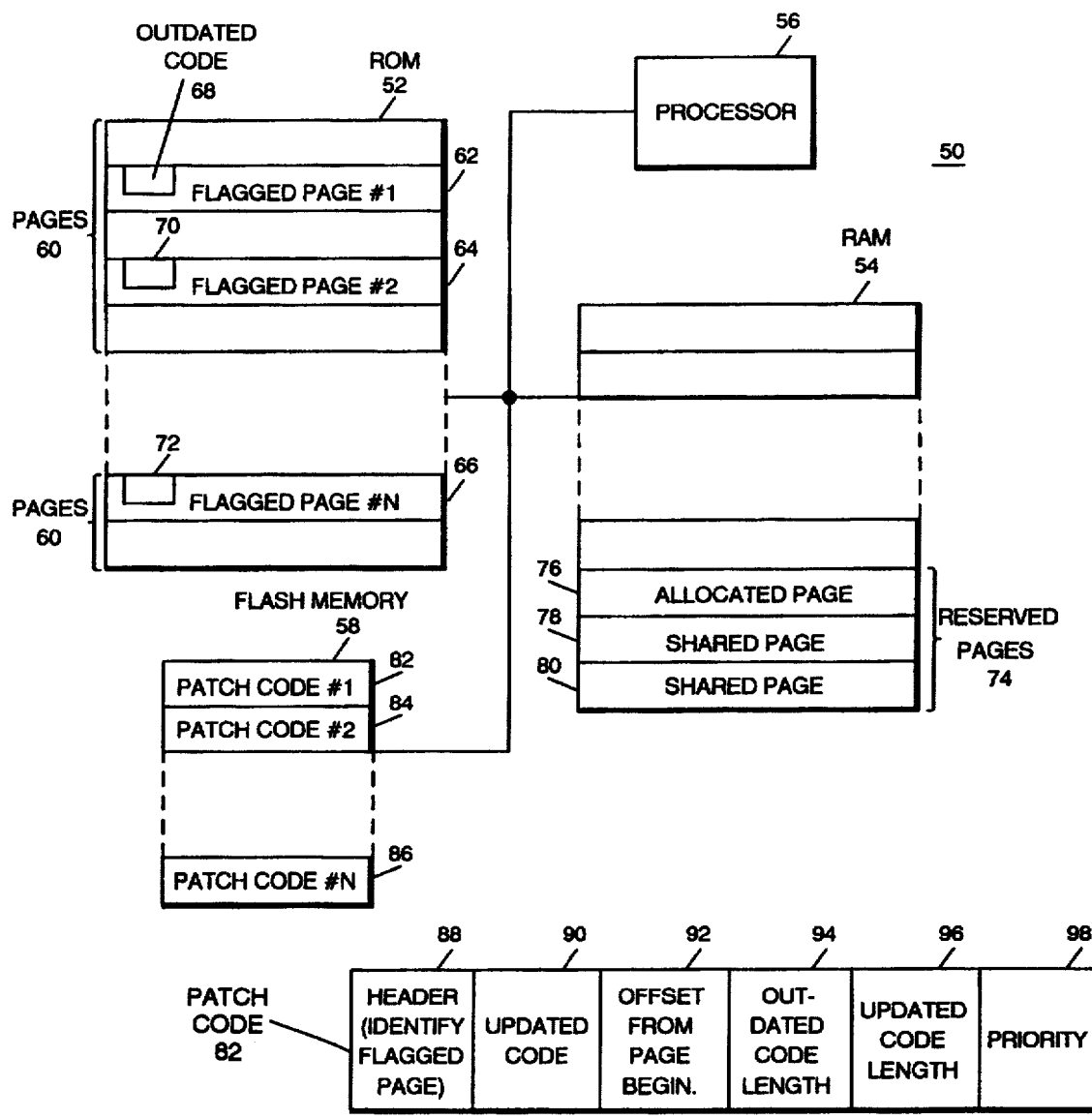
FIG. 3 illustrates a computing system in accordance with the present invention.

FIG. 3 illustrates a computing system 50 that includes a ROM 52, a RAM 54, a processor 56, and a flash memory, or patch memory, 58. The processor 56 may be any type of digital processing element such as a micro processor, micro controller, digital signal processor, or micro computer. The flash memory 58 stores the patch file which includes a plurality of patch code information 82, 84, 86.

The ROM 52 is divided into a plurality of pages 60. Some of the pages are flagged 62, 64, 66 indicating that when those pages are to be read by the processor, they require a patched page to be generated. The RAM 54 is also divided into a plurality of pages wherein some of the pages are reserved 74. Of the reserved pages 74, some are shared pages 78 and 80, while others are allocated pages 76. The allocated pages are for first priority flagged pages, i.e., the critical pages that cannot afford on-the-fly generation of patched pages. The shared pages 78 and 80 are used for second priority flagged page which can afford on-the-fly generation of patched pages.

The flash memory 58, which includes the patch file, is shown to have a plurality of patch code information 82, 84, 86. An exemplary patch code 82 is shown to include a header 88, updated code 90, offset 92, outdated code length 94, updated code length 96, and priority field 98. The header field 88 includes the identity of the particular flagged page to be patched. The updated code field 90 includes the updated code which may be revised programming instructions, data, or programming instructions (or data) that include bug fixes.

The offset from page beginning field 92 includes the number of bits, or bytes, from the beginning of the page at which the outdated code 68 begins. The outdated code length field 94 includes the bit length or byte length of the code to be replaced. The updated code length field includes the bit length or byte length of the updated code. By including the code length fields 94 and 96, the processor, when executing the patch algorithm, can accurately generate the patch code without missing some of the updated code or leaving some of the outdated code in the page. Finally, the priority field indicates whether the associated flagged page is of a first priority or a second priority.

Figure 4:
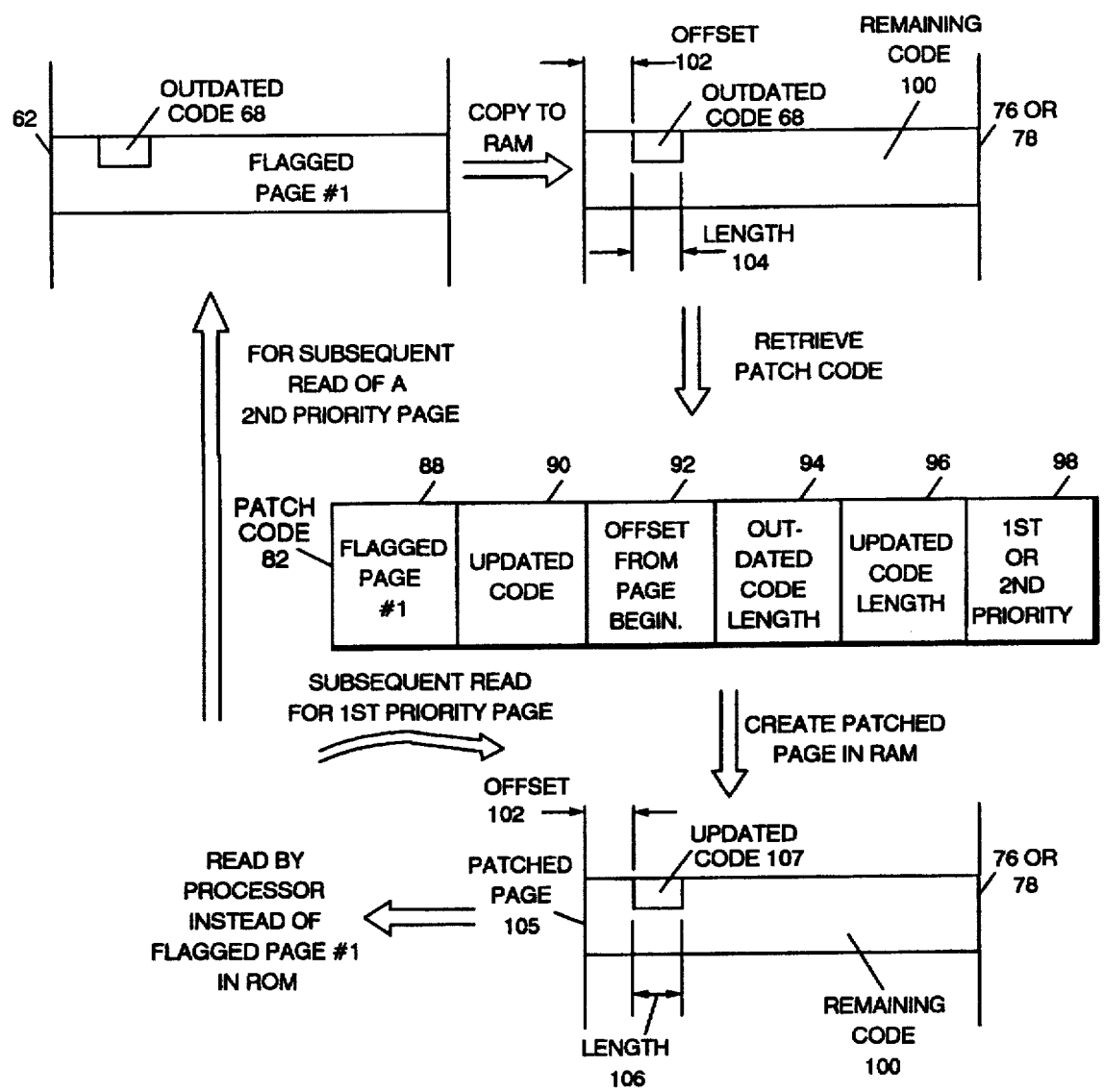
FIG. 4 illustrates an exemplary ROM page patching process in accordance with the present invention.

FIG. 4 illustrates an exemplary process of generating patched code. The flagged page 62 is shown to include outdated code 68. For either a first or a second priority level flagged page, the flagged page is copied into RAM. As shown, the length 104 of the outdated code is shown as well as the offset from the beginning of the page 102. The flagged page No. 1 includes the outdated code 68 and remaining code 100. The flagged page No. 1 may be copied to RAM at the initiation of the algorithm for first priority flagged pages or may be copied to RAM prior to reading the flagged page for second priority pages.

Having copied the flagged page into RAM, the patch code 82 is retrieved. As shown, the patch code 82 includes the identity of the flagged page No. 1, 88, updated code 90, offset from the beginning of the page 92, the outdated code length 94, the updated code length 96, and whether it is a first or second priority page 98. From the patch code and the flagged page in RAM, a patched page 105 is created. As shown, the patched page 105 includes the updated code 107 offset by the offset 102. The updated code 107, having a length 106, and the remaining code 100 make up the patched page 105. Once the patched page 105 is generated, the processor may read it instead of the flagged page in ROM. Thus, the processor can utilize the most current version of the algorithm.

After the processor has read the patched page 105 from RAM, the illustration branches off into two directions. The first direction is for first priority flagged pages. In this direction, whenever the processor needs to read a first priority flagged page, it simply accesses the allocated page of RAM to retrieve the patched page. The second direction is for second priority flagged pages which causes the entire process to be executed.

The present invention provides a method and apparatus for patching pages of ROM with a minimal number of RAM pages. This is accomplished by sharing the RAM pages to patch ROM pages. Thus, by patching ROM pages in real time, the costly RAM pages are used more effectively and also eliminates the one-to-one dedication of RAM pages to flagged ROM pages.

What is claimed is:

1. A method for patching pages of a Read Only Memory ROM) using reserved pages of Random Access Memory (RAM), the method comprising the steps of:

a) identifying a first priority flagged page and a second priority flagged page of a plurality of pages of the ROM;

b) allocating one of the reseed pages of the RAM for the first priority flagged page;

c) storing a first patched page in the one of the reserved pages of the RAM, wherein the first patched page includes updated code replacing at least a portion of code of the first priority flagged page and wherein the first patched page is read from the RAM each time the first priority flagged page is to be read;

d) when the second priority flagged page is to be read, storing a second patched page in a shared page of the reserved pages of the RAM, wherein the second patched page includes second updated code replacing at least a portion of second code of the second priority flagged page; and e) after reading the second patched page, replacing the second patched page in the shared page of the RAM with a subsequent page of code.

2. The method of claim 1, wherein step (e) further comprises the step of:

replacing the second patched page with another patched page, wherein the another patched page includes other updated code replacing at least a portion of code of another second priority flagged page of the plurality of pages.

3. The method of claim 1, wherein step (e) further comprises the step of:

replacing the second patched page with a null page of code.

4. A processor readable storage medium for storing program instructions that, when read by a processor, causes the processor to patch pages of a Read Only Memory (ROM) using reserved pages of Random Access Memory (RAM), the processor readable storage medium comprising:

first storage means for storing program instructions that cause the processor to identify a first priority flagged page and a second priority flagged page of a plurality of pages of the ROM;

second storage means for storing program instructions that cause the processor to allocate one of the reserved pages of the RAM for the first priority flagged page;

third storage means for storing program instructions that cause the processor to store a first patched page in the one of the reserved pages of the ROM, wherein the first patched page includes updated code replacing at least a portion of code of the first priority flagged page, and wherein, each time the processor is to read the first priority flagged page, the processor reads the first patched page from the RAM;

fourth storage means for storing program instructions that cause the processor to store a second patched page in a shared page of the reserved pages of the RAM when the second priority flagged page is to be read, wherein the second patched page includes second updated code replacing at least a portion of second code of the second priority flagged page; and fifth storage means for storing program instructions that cause the processor to replace the second patched page in the another one of the reserved pages of the RAM with a subsequent page of code after the processor reads the second patched code from the shared page.

5. The processor readable storage medium of claim 4, wherein the fifth storage means further functions to:

replace the second patched page with another patched page, wherein the another patched page includes other updated code replacing at least a portion of code of another second priority flagged page of the plurality of pages.

6. The processor readable storage medium of claim 4, wherein the fifth storage means further functions to:

replace the second patched page with a null page of code.

7. An embedded processing system comprising:

Read Only Memory (ROM) that includes a plurality of pages for storing code;

Random Access Memory (RAM) operably coupled to the ROM, wherein the RAM includes a plurality of reserved page;

patch memory for storing patch code and patch program instructions, wherein the patch code includes updated code and an identity of outdated code; and a processor operably coupled to the ROM, the RAM, and the patch memory, wherein the processor executes the patch program instructions to:

identify a first priority flagged page and a second priority flagged page of a plurality of pages of the ROM;

allocate one of the reserved pages of the RAM for the first priority flagged page;

store a first patched page in the one of the reserved pages of the RAM, wherein the first patched page includes updated code replacing at least a portion of code of the first priority flagged page and wherein the first patched page is read from the RAM each time the first priority flagged page is to be read;

store a second patched page in a shared page of the reserved pages of the RAM, wherein the second patched page includes second updated code replacing at least a portion of second code of the second priority flagged page, when a second priority flagged page is to be read; and replace the second patched page in the shared page of the RAM with a subsequent page of code, after reading the second patched page.

\* \* \* \* \*

UNITED STATES PATENT AND TRADEMARK OFFICE
CERTIFICATE OF CORRECTION

PATENT NO : 5,802,549
DATED : Sep. 1, 1998
INVENTOR(S) : Goyal

It is certified that error appears in the above-identified patent and that said Letters Patent is hereby corrected as shown below:

Column 5, line 21: delete "reseed" and insert --reserved--.
Column 6, line 1: delete "ROM" and insert --RAM--.
Column 6, line 36: delete "page" and insert --pages--.

Signed and Sealed this

Second Day of February, 1999

Attest:

Attesting Officer

*Acting Commissioner of Patents and Trademarks*